United States Patent
Caminiti et al.

(10) Patent No.: US 9,503,345 B2
(45) Date of Patent: Nov. 22, 2016

(54) CLOUD SERVICES SYSTEM

(71) Applicant: Accenture Global Services Limited, Dublin 4 (IE)

(72) Inventors: Pietro Caminiti, Rome (IT); Paolo Trevisan, Rome (IT); Alessandro Duminuco, Vibonati Salerno (IT); Simone Tiberia, Rome (IT); Valerio Romano, Rome (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 253 days.

(21) Appl. No.: 13/776,055

(22) Filed: Feb. 25, 2013

(65) Prior Publication Data
US 2013/0238788 A1   Sep. 12, 2013

(30) Foreign Application Priority Data
Feb. 24, 2012   (EP) .................................. 12425037

(51) Int. Cl.
   *G06F 9/50*   (2006.01)
   *H04L 12/66*  (2006.01)
   *H04L 12/26*  (2006.01)
   *H04L 12/24*  (2006.01)
(52) U.S. Cl.
   CPC ....... *H04L 43/0876* (2013.01); *H04L 41/5054* (2013.01); *H04L 41/5096* (2013.01)
(58) Field of Classification Search
   CPC ................ H04L 2001/0094; H04L 12/40032; H04L 12/4641; H04L 41/02; H04L 29/08288; H04L 29/06102; H04L 69/161
   USPC ............................................. 709/224
   See application file for complete search history.

(56) References Cited

U.S. PATENT DOCUMENTS

| | | | |
|---|---|---|---|
| 8,812,687 B2* | 8/2014 | Das | H04L 67/10 709/223 |
| 9,250,974 B1* | 2/2016 | Estes | G06F 9/5072 |
| 2009/0228950 A1* | 9/2009 | Reed | H04L 63/0807 726/1 |
| 2010/0332615 A1* | 12/2010 | Short | H04L 63/08 709/217 |
| 2011/0145439 A1* | 6/2011 | Chaturvedi | G06F 9/5027 709/244 |
| 2011/0231899 A1* | 9/2011 | Pulier | G06F 9/45558 726/1 |
| 2012/0023501 A1* | 1/2012 | Chi | G06Q 30/0283 718/103 |
| 2012/0072985 A1* | 3/2012 | Davne | H04L 63/0272 726/22 |

(Continued)

FOREIGN PATENT DOCUMENTS

WO   WO 2009100402 A1 *  8/2009 ......... H04L 12/2602
WO   WO 2010027489 A1 *  3/2010 ............ H04L 67/20

*Primary Examiner* — Kevin Bates
*Assistant Examiner* — Golam Mahmud
(74) *Attorney, Agent, or Firm* — Mannava & Kang, P.C.

(57) ABSTRACT

A cloud services system includes an access services layer, a cloud service manager, and a service platform layer. The access services layer provides front-end functionality for users and service providers to order and manage cloud services, including software applications provided for use by the users. The cloud manager exposes services provided by the cloud services system to the users, and orchestrates delivery of the services and provisioning of resources for the services. The service platform layer activates virtual machines and virtual desktops to provide the services.

12 Claims, 14 Drawing Sheets

(56) References Cited

U.S. PATENT DOCUMENTS

| | | | | |
|---|---|---|---|---|
| 2012/0151481 A1* | 6/2012 | Kang | G06F 9/4445 | 718/1 |
| 2012/0311157 A1* | 12/2012 | Erickson | G06F 9/541 | 709/226 |
| 2013/0007272 A1* | 1/2013 | Breitgand | G06Q 10/06 | 709/224 |
| 2013/0110993 A1* | 5/2013 | Liu | H04L 29/08981 | 709/220 |
| 2013/0124712 A1* | 5/2013 | Parker | H04L 41/5038 | 709/224 |
| 2013/0219042 A1* | 8/2013 | Behrendt | H04L 43/0876 | 709/224 |
| 2014/0280918 A1* | 9/2014 | Grandhe | G06Q 30/0631 | 709/224 |

* cited by examiner

Admin Portal
123

FIG. 2C

Virtual Desktop Administrator
142

CLOUD SERVICES SYSTEM

BACKGROUND

Cloud computing typically involves using remote computing resources on a pay-per-use basis, where the remote computing resources may be used alone or in conjunction with internal computing resources. For example, processing resources and storage resources of a cloud service provider, such as Amazon Web Services, Microsoft Azure, or Rackspace Cloud Servers, can be requested and used on-demand in a scalable fashion. Cloud computing can be used to provide applications and information to end user devices, such as laptops, personal computers, thin clients, mobile devices, etc. Cloud computing can be used for applications with varying or unpredictable demand like year-end financials or tax-return preparation. Additionally, computationally-intensive processing, such as Monte Carlo simulations or protein folding, can be performed using cloud computing resources.

Given the variation in applications, variations in demand, variations in hosting platforms, and variations in end user devices, it can be difficult for a service provider to set up and implement cloud computing services. A cloud service provider should have skills and resources to provision (e.g., to define, make ready for use, setup, etc.), use and manage computing resources and applications. However, in many instances, a service provider planning to set up cloud services for the first time may lack familiarity with the provisioning and management of resources for cloud services. Also, the service provider may have a limited budget for the provisioning. As a result, it can be difficult, time consuming and cost prohibitive for a service provider to set up and provide cloud services.

SUMMARY

According to an embodiment, a cloud services system includes an access services layer, a cloud service manager, and a service platform layer. The access services layer provides front-end functionality for users and service providers to order and manage cloud services, including software applications provided for use by the users. The cloud manager exposes services provided by the cloud services system to the users, and orchestrates delivery of the services and provisioning of resources for the services. The service platform layer interacts with infrastructure in order to activate virtual machines and virtual desktops to provide the services.

The cloud services system may be implemented on a computer platform including a data storage and a processor. Methods may be performed by the cloud services system to provide cloud services to users. The methods may be embodied as machine readable instructions stored on a non-transitory computer readable medium and executable by a processor.

BRIEF DESCRIPTION OF THE DRAWINGS

Embodiments are described in detail in the following description with reference to the following figures. The embodiments are illustrated by way of example and are not limited by the accompanying figures in which like reference numerals indicate similar elements.

FIGS. 2A-E show components of an access services layer of the cloud service system;

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments. Furthermore, different embodiments are described below, and the embodiments may be used or performed together in different combinations.

According to an embodiment, a cloud services system is provided that may be implemented by a service provider or another entity. In one example, the cloud services system may be implemented by a telecommunications provider that may have the "pipes" for providing cloud services. "Pipes" includes the network infrastructure for providing the cloud services. The cloud services system may be implemented by entities other than a telecommunications provider.

Figure 1:
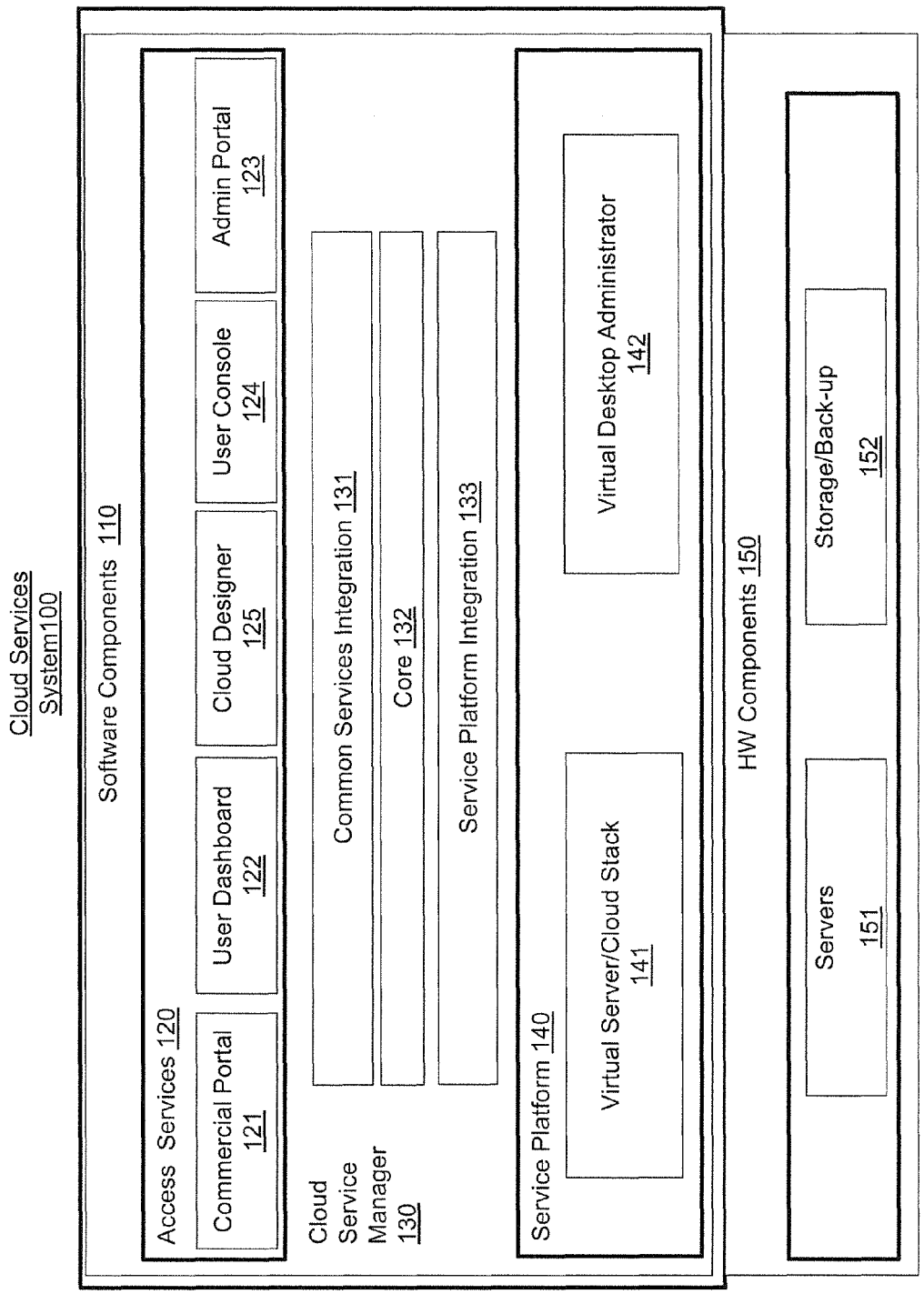
FIG. 1 shows an architecture of a cloud services system.

FIG. 1 illustrates a system architecture for a cloud services system 100, according to an embodiment. The architecture includes software components 110 and hardware components 150. The software components 110 may include an access services layer 120, a cloud service manager 130 and a service platform layer 140.

Figure 2A:
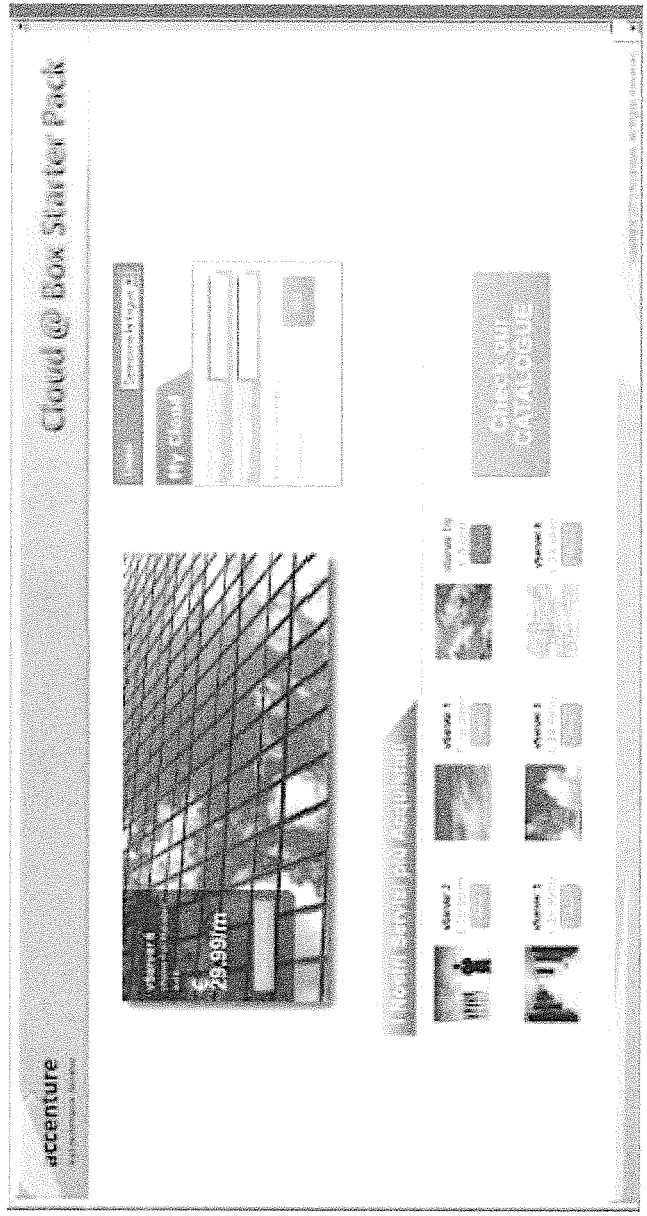
Figure 2B:
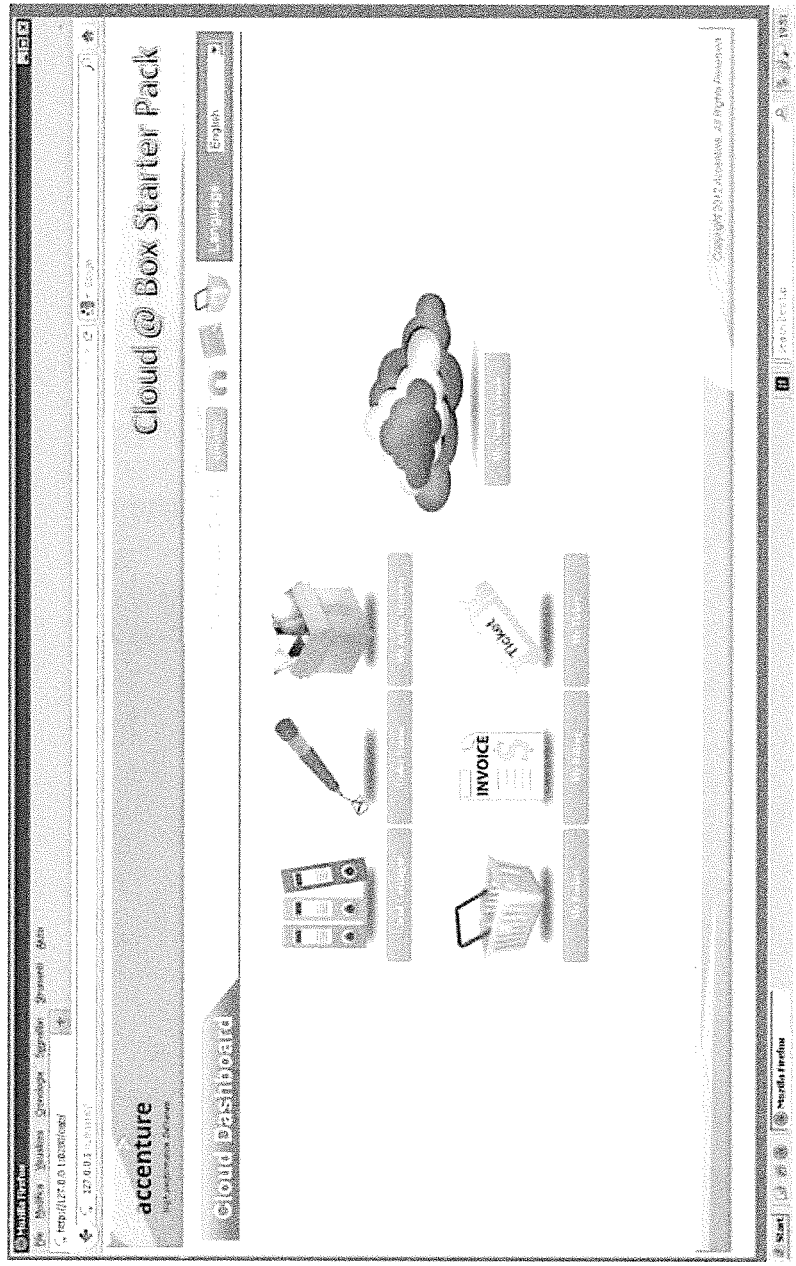
Figure 2C:
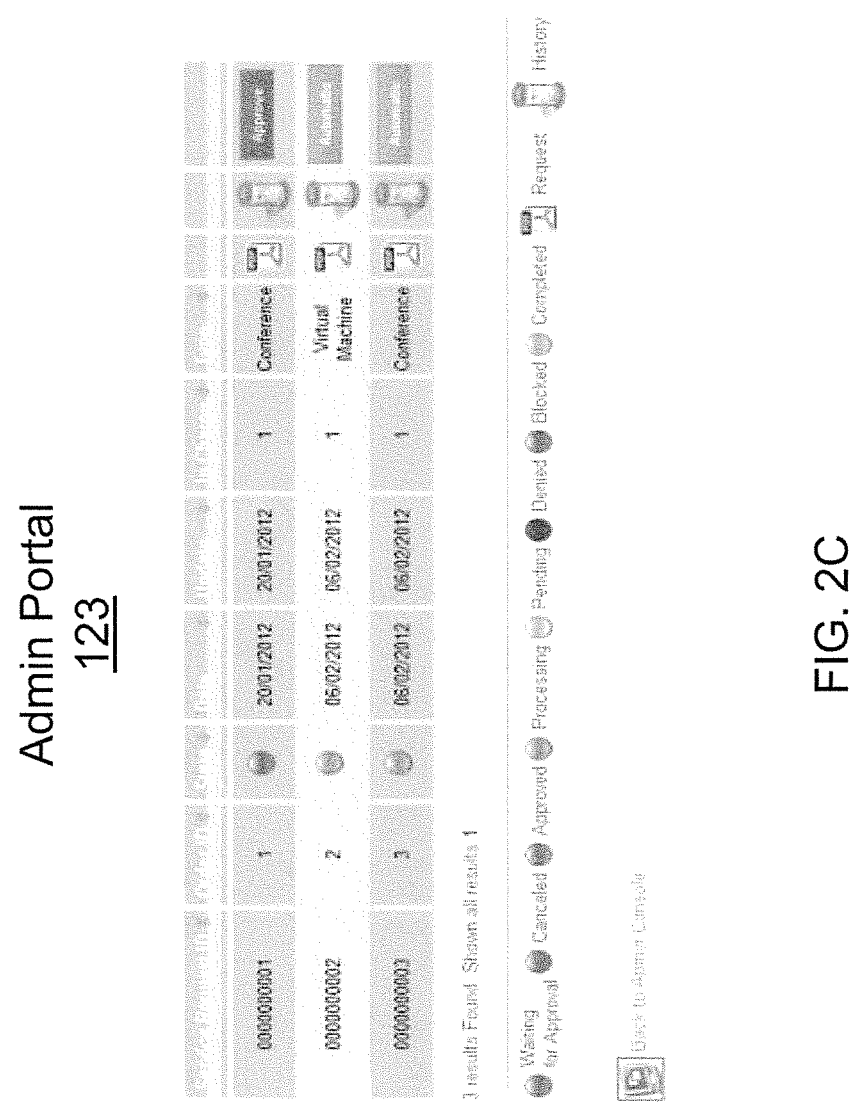

The access services layer 120 provides the front-end functionality for users and service providers. The access services layer 120 may include a commercial portal 121, a user dashboard 122, an administrator portal 123, user console 124 and cloud designer 125. FIGS. 2A-C show aspects of the commercial portal 121, the user dashboard 122 and the administrator portal 123. The commercial portal 121, the user dashboard 122 and the administrator portal 123 may include a graphical user interface (GUI) that allows users to view and enter information. FIG. 2A shows some functions of the commercial portal 121. The commercial portal 121, for example, allows users of the cloud services system 100 to view service catalogs, perform self-ordering, receive quotations, request submissions and view invoice. The commercial portal 121 also provides order status tracking, an activated service view and functions for change request management. The commercial portal 121 may be used by large enterprises and small and medium enterprises or other types of users to access these functions provided by the cloud services system 100. The commercial portal 121 could be used for either internal (private) cloud or public cloud services.

FIG. 2B shows some functions of the user dashboard 122. The user dashboard 122, for example, allows the user to access service details, manage orders for cloud services, open and review ticket status, and review customer invoicing. The user dashboard 122 may be used by end user consumers, small businesses or other entities to perform these actions.

FIG. 2C shows some functions of the administrator portal 123. The administrator portal 123 may be used by the service provider implementing the cloud services system 100. The administrator portal 123, for example, allows an administrator or other user with appropriate access privileges to monitor and manage services, and perform trouble shooting. The administrator, via the administrator portal 123, may monitor and manage services, which may include monitoring orders and evaluating technical feasibility. The administrator portal 123 also allows the administrator to view and manage service configurations and usage.

Figure 2D:
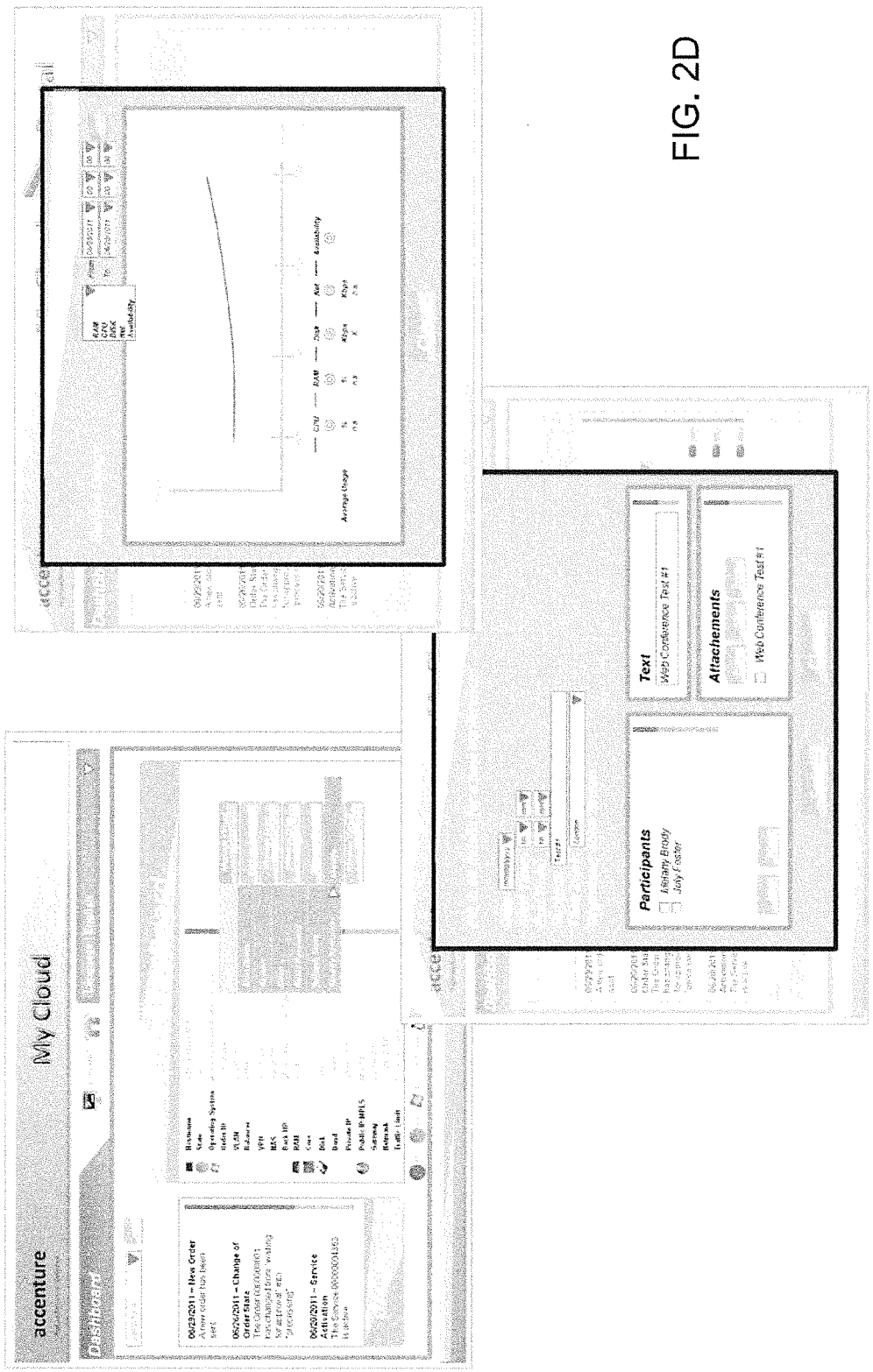
Figure 2E:
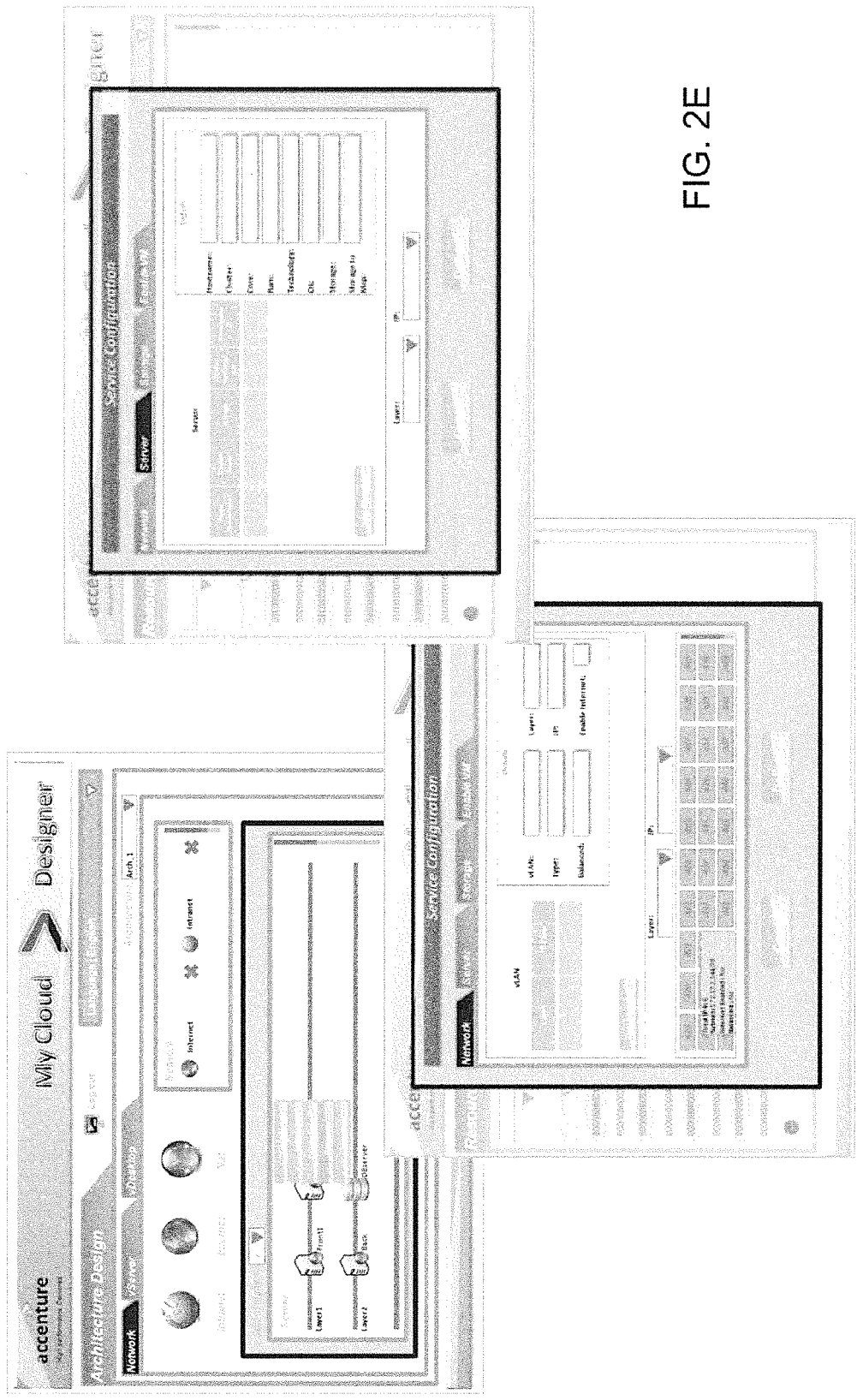

FIGS. 2D-G show examples of screenshots that may be generated via the commercial portal 121, the user dashboard 122, and/or the administrator portal 123. FIG. 2D shows a screen shot of service board and modifying resources for ordered services. FIG. 2D also shows screen shots of usage information for resources. FIG. 2E shows screenshots for identifying resources for designing the cloud services system and for designing cloud services to be administered by the cloud services system. The architecture design screenshot shows selecting servers, virtual servers and virtual desktops to provide cloud services. The service configuration screenshots show options for creating cloud services. Generally, the cloud design screenshots show that users can order and manage complex infrastructure architecture (virtual data center) or an administrator can create, validate and deliver custom services for an "ad hoc" initiative. The user console screenshots generally show that a user may manage its services through self-management interfaces with functionalities made available through the access services layer 120.

The cloud service manager 130 shown in FIG. 1 exposes the services provided by the cloud services system 100 to the users, and orchestrates service delivery, technical provisioning and other management functions. The cloud service manager 130 may include a common services integration layer 131, a core 132, and a service platform integration layer 133. The common services integration layer 131, the core 132, and the service platform integration layer 133 are further described with respect to FIGS. 3A-C.

Figure 3A:
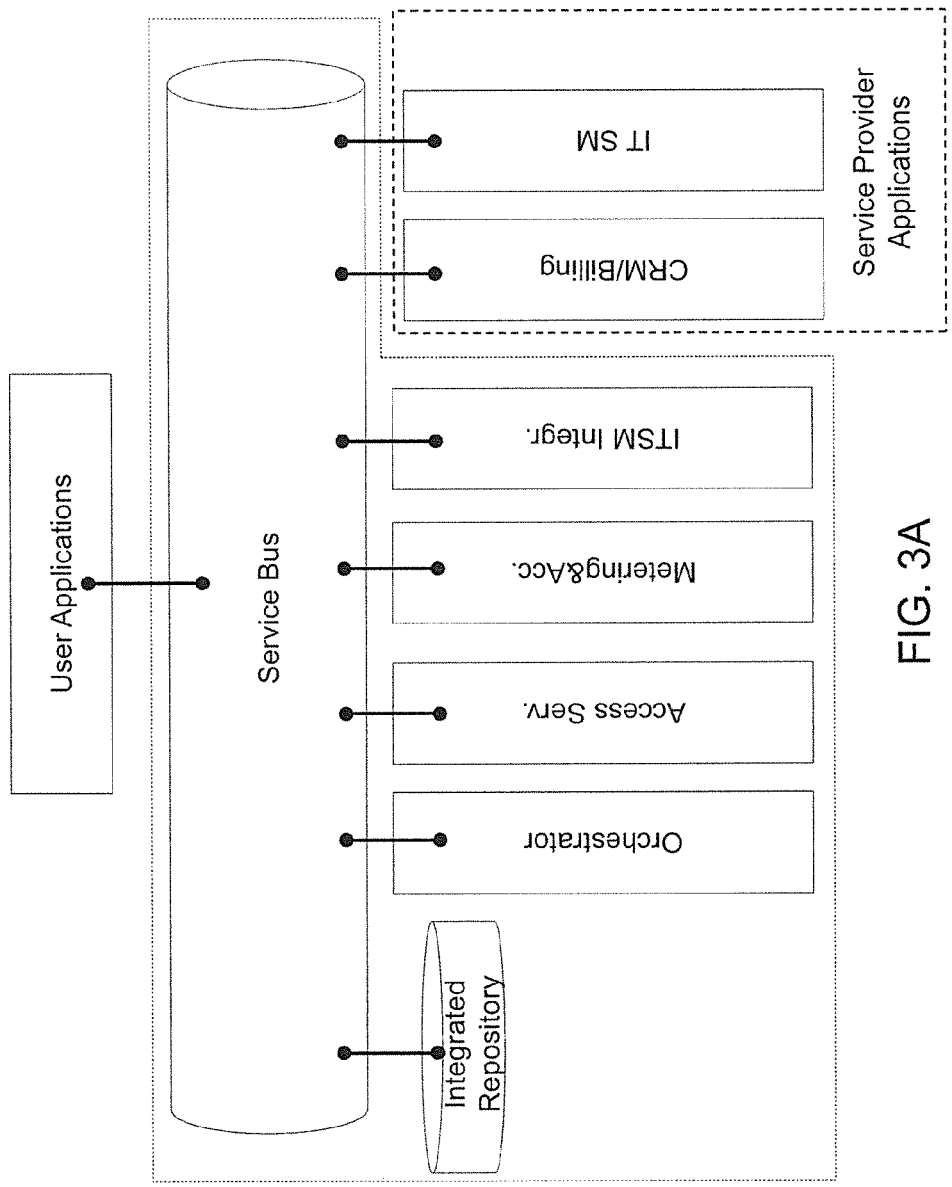
FIGS. 3A-C show components of a cloud service manager of the cloud service system.

FIG. 3A shows the common services integration layer 131 integrating the functions of the cloud service manager 130 with the service provider and the user applications. For example, the common services integration layer 131 may comprise a service bus to provide services to external applications, which may include applications of the user and applications of the service provider. FIG. 3A shows the service bus connecting functions and an integrated repository of the cloud service manager 130 with user applications and service provider applications. For example, the functions of the cloud service manager 130 may include orchestration of services, access services, metering, and information technology (IT) service management integration. The service bus connects the functions of the cloud service manager 130 to an IT service management application of the service provider and a customer resource management and billing application of the service provider. The service bus also connects the functions with the enterprise applications of the user.

The integrated repository shown in FIG. 3A may include a central data repository containing a commercial and technical service catalog and hierarchy structure, service order information including service order data, progress status and service composition, and service configuration information including service configurations, usage and related open tickets for services.

The IT service management integration shown in FIG. 3A may include an application program interface integrating the IT service management application of the service provider with the cloud service manager 130. The IT service management application of the service provider may monitor hardware resources.

The metering function shown in FIG. 3A may include collection of resource usage data and applying charging rules based on the types of services being provided to the user. For example, the metering function may collect resource data information on virtual machine (VM) "active" status. The metering function may apply pay-per-use charging rules (e.g., flat fee per VM daily active status). The usage and charging data may be stored in the integrated repository.

Figure 3B:
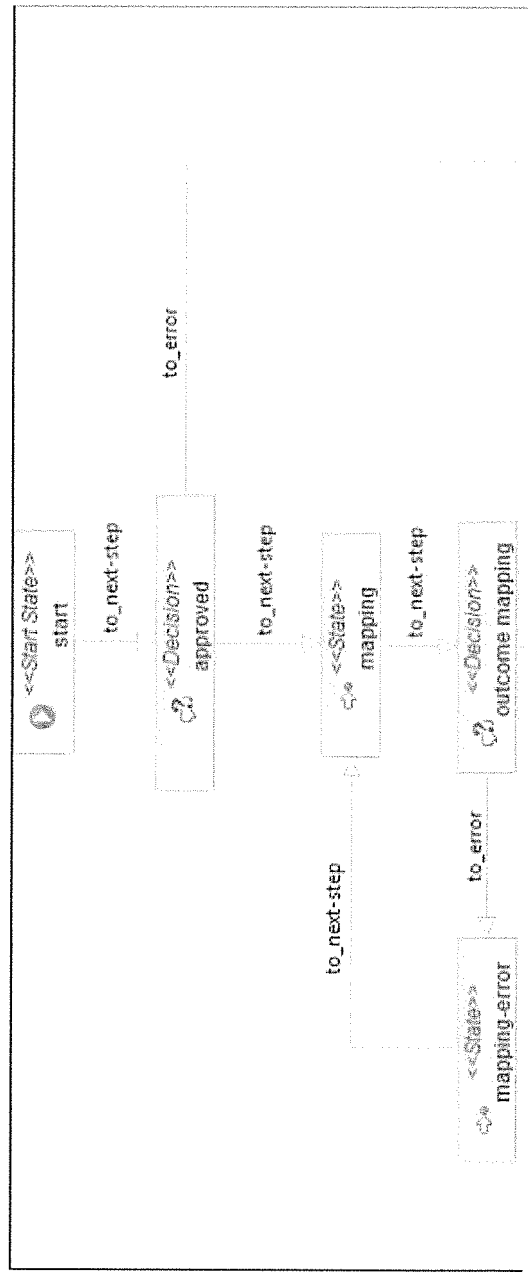

The core 132 orchestrates service delivery and management. FIG. 3B shows some of the functions performed by the core 132 to orchestrate service delivery and management. The core 132, for example, contains workflow logic for provisioning, metering and accounting, and ticket processing. The core 132 may perform automated tasks for providing resources on demand, usage data collection, data retrieval and storing into the integrated repository, customer and service configuration, and usage data communication to external applications for billing. The core 132 also facilitates tasks for assessing technical feasibility to provide services, design of services, and ticket management.

Figure 3C:
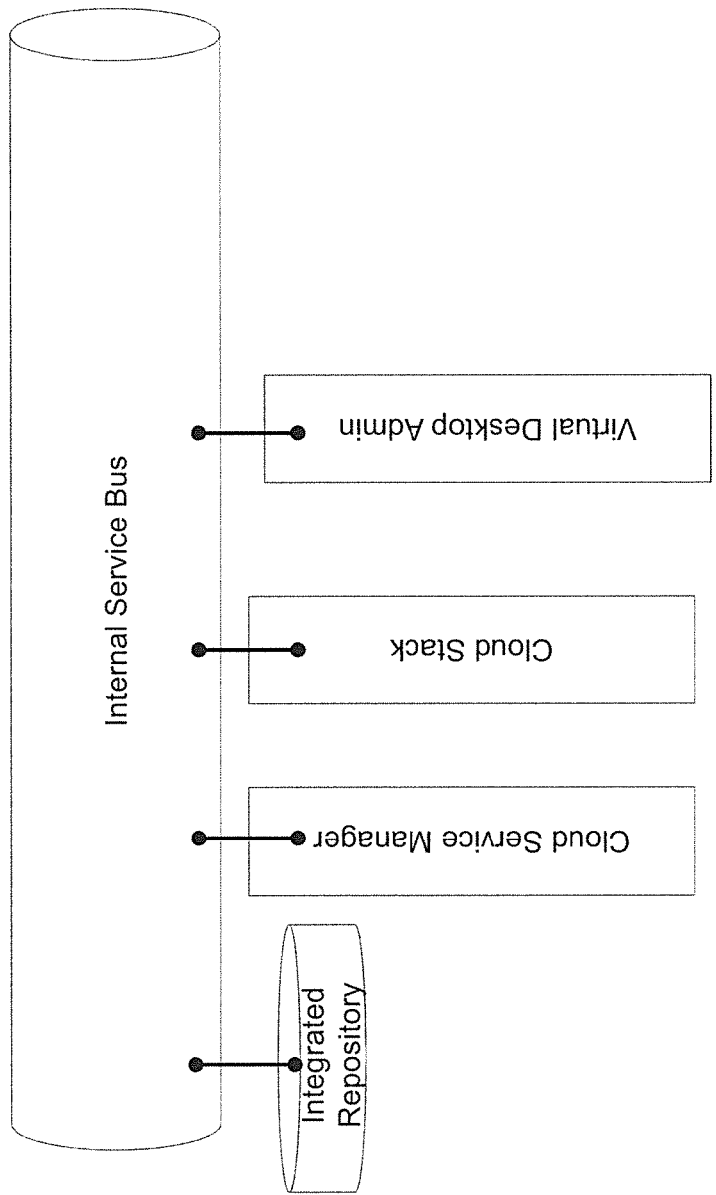

FIG. 3C shows the service platform integration layer 133 integrating the cloud service manager 130 with the service platform layer 140. The service platform integration layer 133, for example, operates as an internal service bus connecting components of the cloud service manager 130 with the service platform layer 140. For example, FIG. 3C shows the service platform integration layer 133 operating as an internal service bus connecting the cloud service manager 130 with a cloud stack for VM activation and with a virtual desktop administrator of the service platform layer 140.

Figure 4A:
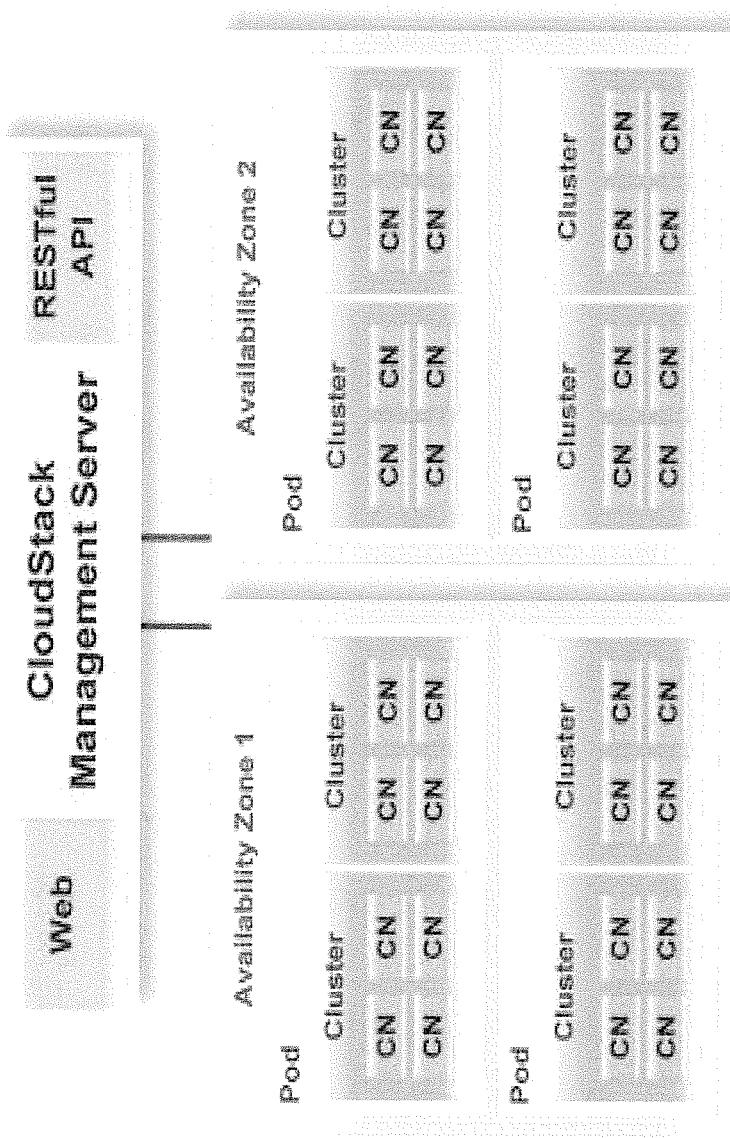
FIGS. 4A-B show components of a service platform layer of the cloud services system.

FIG. 1 shows the server platforms 140 including a virtual server/cloud stack 141 and virtual desktop administrator 142. The cloud stack provides capabilities to activate infrastructure as a service, including VMs, operating systems, firewalls, software applications, and hypervisors. FIG. 4A shows the virtual server/cloud stack 141 managing clusters in pods. The clusters may include physical hosts, each with its assigned storage. The host can run the hypervisor. The storage can be local or shared storage. Pods are groups of clusters.

Figure 4B:
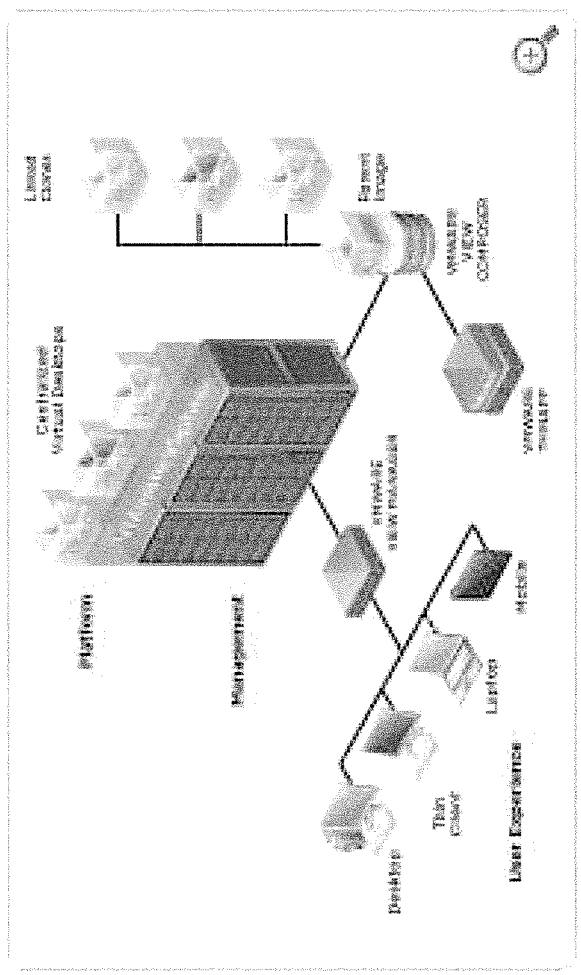

FIG. 4B shows the virtual desktop administrator 142 which may create and manage virtual desktops. The virtual desktop administrator 142 may allow the user to customize virtual desktops.

The hardware components 150 shown in FIG. 1 may be provided by the service provider or another entity. The hardware components 150 may include servers 151 and storage 152. The hardware components 150 are the hardware resources operating as platforms for the services delivered to users. The hardware components 150 host the VMs and virtual desktops.

Figure 5:
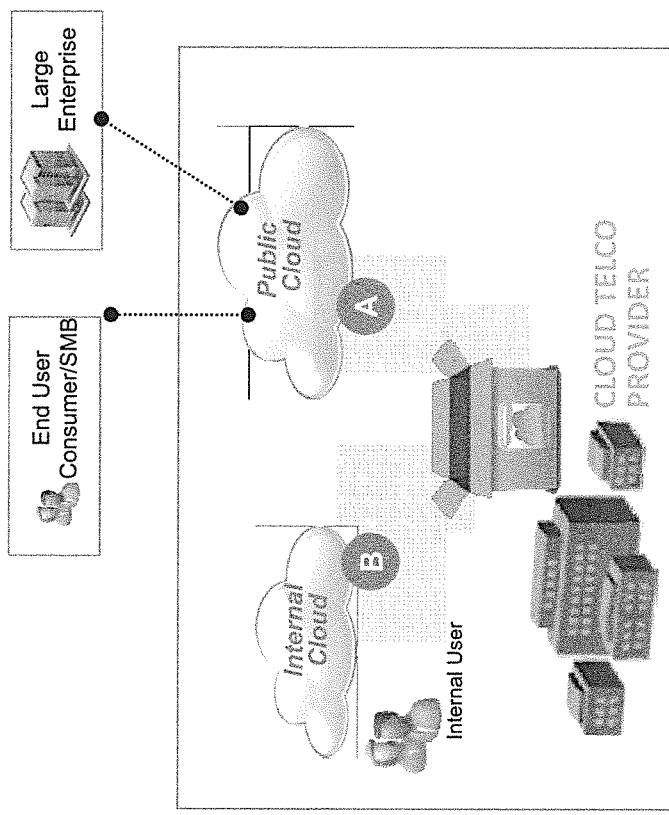
FIG. 5 shows the cloud services system used by different types of users.

FIG. 5 shows an example of using the cloud services system 100 to provide services to different types of users, including end users/small businesses, large enterprises and internal users. Also, the cloud services system 100 may be implemented via a public cloud or an internal cloud for an organization and its users.

The cloud services system 100 may be extended to include software as a service (SaaS) and platform as a service (PaaS) services. Also, different business models may be used for the cloud services system 100. Some business models may include provide cloud services to users, such as small businesses, end users, and large enterprises, in a pay-per-use arrangement. Other models may include providing cloud services to wholesalers, extend cloud services through partners, include additional services from federated cloud providers, or provide cloud services via brokering services.

Figure 6:
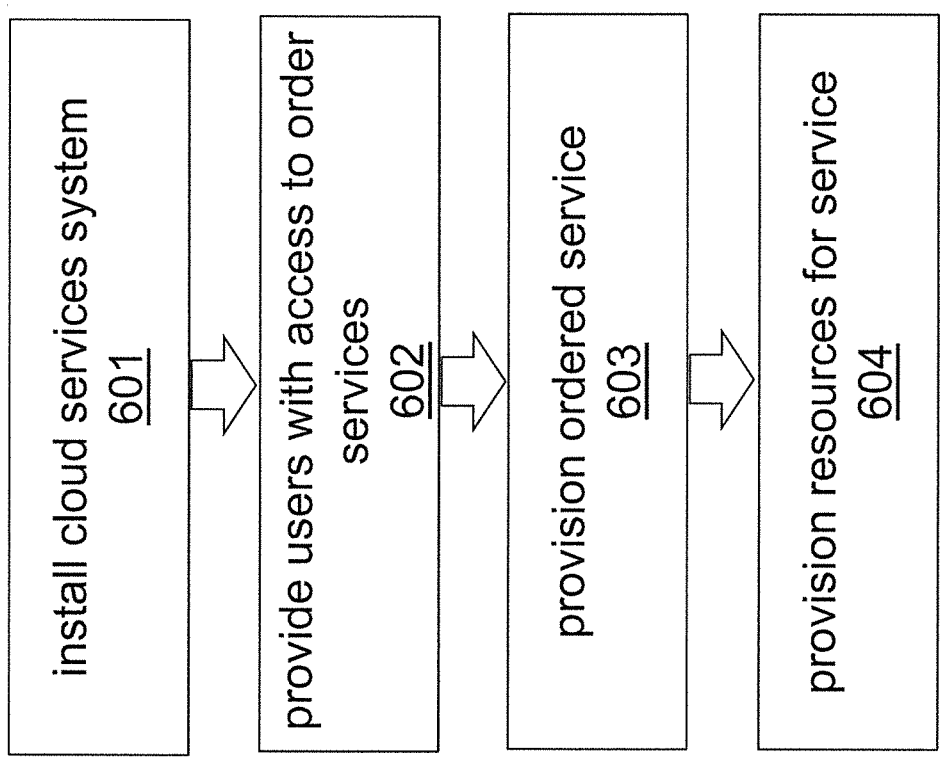
FIG. 6 shows a flow chart of a method for providing cloud services.

FIG. 6 shows a flow chart of a method that may be implemented by the cloud services system 100. At 601, the layers of the cloud services system 100 are installed on a computing platform and executed, for example, by a telecommunications provider. At 602, the access services layer provides users with access to order services. At 603, the cloud service manager 130 facilitates provisioning of the ordered service. At 604, the service platform layer 140 provisions virtual servers and virtual desktops for the ordered services.

Some or all of the methods and operations and functions described above may be provided as machine readable instructions, such as computer programs, stored on a computer readable storage medium, which may be non-transitory such as hardware storage devices or other types of storage devices. For example, they may exist as program(s) comprised of program instructions in source code, object code, executable code or other formats. An example of computer readable storage media includes a RAM, ROM, EPROM, EEPROM, hard drivers, etc.

Figure 7:
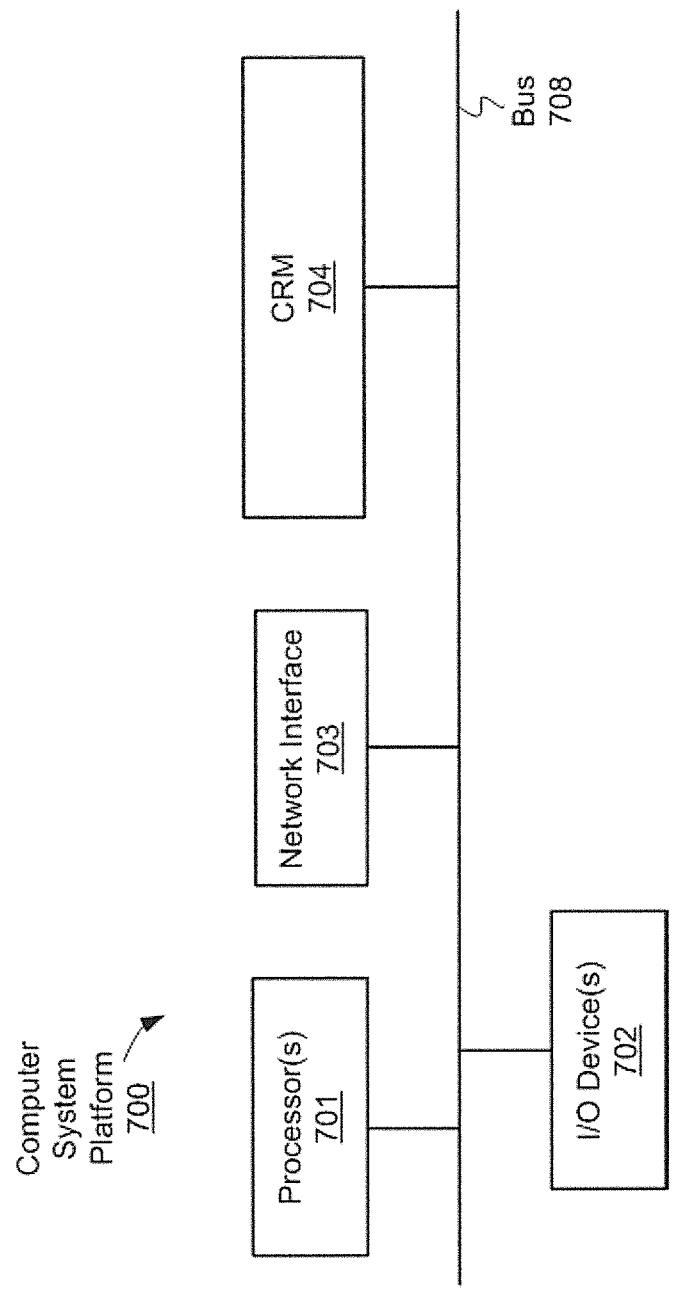
FIG. 7 shows a computer system that may be used as a platform for the cloud services system.

Referring to FIG. 7, there is shown a computer system 700 that may be a computer platform for executing the cloud services system 100. It is understood that the illustration of the computer system 700 is a generalized illustration and that the computer system 700 may include additional components and that some of the components described may be removed and/or modified.

The computer system 700 includes processor(s) 701, such as a central processing unit, ASIC or other type of processing circuit; I/O devices 702, such as a monitor and/or keyboard; a network interface 703, such as a network interface to a Local Area Network (LAN), a wireless 802.11x LAN, a 3G or 4G mobile WAN or a WiMax WAN; and a computer-readable medium 704. Each of these components may be operatively coupled to a bus 708. A computer readable medium (CRM), such as CRM 704 may be any suitable medium which participates in providing instructions to the processor(s) 701 for execution. For example, the CRM 704 may be non-transitory or non-volatile media, such as a magnetic disk or solid-state non-volatile memory or volatile media such as RAM. The instructions stored on the CRM 704 may include machine readable instructions executed by the processor 701 to perform the methods and functions of the cloud services system 100.

While the embodiments have been described with reference to examples, those skilled in the art will be able to make various modifications to the described embodiments without departing from the scope of the claimed embodiments.

What is claimed is:

1. A cloud services system comprises:
   data storage; and
   a processor to execute:
   an access services layer to provides front-end functionality for users and service providers to order and manage cloud services and software applications provided for use by the users, wherein the access services layer
   receives a request for a cloud service of the cloud services via a front-end graphical user interface,
   receives user input for creating and customizing a virtual desktop for the requested cloud service,
   creates the customized virtual desktop, and
   displays the customized virtual desktop, including resources for designing the managed cloud services, the displayed resources including servers and virtual servers;
   a cloud service manager comprising a common services integration layer, a core, and a service platform integration layer to:
   expose services provided by the cloud services system to the users, and
   orchestrate delivery of the services and provisioning of the resources for the services,
   wherein the core comprises workflow logic to facilitate assessing technical feasibility of the cloud services system to provide services, design of services, and ticket management; and
   a service platform layer comprising a cloud stack and a virtual desktop administrator, the service platform layer to activate virtual machines, hypervisors, and virtual desktops to provide the services, wherein the cloud stack manages clusters in pods, the clusters including physical hosts that have assigned storage and are to run the hypervisors, and the pods are arranged into a plurality of availability zones.

2. The cloud services system of claim 1, wherein the common services integration layer comprises a service bus to interface the cloud services system with user applications and service provider applications hosted on computer platforms external to the cloud services system and to interface the cloud services system with a data repository of the cloud services system.

3. The cloud services system of claim 2, wherein the data repository stores a service catalog listing services provided by the cloud services system, service order information including service order data, progress status and service composition, and service configuration information including service configurations and usage.

4. The cloud services system of claim 1, wherein the service platform integration layer comprises an internal service bus connecting components of the cloud service manager with the service platform layer.

5. The cloud services system of claim 2, wherein the cloud manager exposes the services provided by the cloud services system to the users via the service bus.

6. The cloud services system of claim 2, wherein the provisioned resources are maintained by at least one of the service providers, and the service bus connects the cloud manager to an information technology service management application of the at least one service provider to manage the provisioned resources.

7. The cloud services system of claim 2, wherein the service bus connects the cloud manager to a customer resource management and billing application of the at least one service provider to bill the users for the services.

8. A cloud services system comprises:
   data storage; and
   a processor to execute:
   an access services layer to provide a front-end graphical user interface for users and service providers to order and manage cloud services and software applications provided for use by the users, wherein the access services layer receives a request for a cloud service of the cloud services via the front-end graphical user interface, receives user input for customizing a virtual desktop for the requested cloud service, creates and displays the virtual desktop, wherein to display the virtual desktop, the access services layer is to display resources for designing the cloud service, the resources including servers, and virtual servers;

a cloud service manager comprising:

a common services integration layer comprising a service bus interfacing the cloud services system with user applications and service provider applications hosted on computer platforms external to the cloud services system and interfacing the cloud services system with a data repository of the cloud services system, and a core comprising workflow logic to facilitate assessing technical feasibility to provide services, design of services, and ticket management, wherein the cloud manager exposes services provided by the cloud services system to the users via the service bus, and orchestrates delivery of the services and provisioning of resources for the services, and a service platform layer comprising a cloud stack and a virtual desktop administrator, the service platform layer to activate virtual machines, hypervisors, and virtual desktops to provide the services, wherein the cloud stack manages clusters in pods arranged into a plurality of availability zones, and wherein the clusters include physical hosts that have assigned storage and are to run the hypervisors.

9. The cloud services system of claim 8, wherein the data repository stores a service catalog listing services provided by the cloud services system, service order information including service order data, progress status and service composition, and service configuration information including service configurations and usage.

10. The cloud services system of claim 8, wherein the provisioned resources are maintained by at least one of the service providers, and the service bus connects the cloud manager to an information technology service management application of the at least one service provider to manage the provisioned resources.

11. The cloud services system of claim 8, wherein the service bus connects the cloud manager to a customer resource management and billing application of the at least one service provider to bill the users for the services.

12. A method for managing cloud services via a cloud services system, the method comprising:

exposing cloud services to users, provisioning resources for the cloud services, and orchestrating delivery of the cloud services to the users, wherein the exposing, the provisioning, and the orchestrating is performed by a processor and includes:

interfacing, via a service bus, the cloud services system with user applications and service provider applications hosted on computer platforms external to the cloud services system;

interfacing the cloud services system with a data repository;

provisioning virtual servers, virtual machines, and hypervisors to provide the cloud services;

running the hypervisors, wherein running the hypervisors includes managing clusters organized in pods, the clusters including physical hosts having assigned storage, and the pods are arranged into a plurality of availability zones, receiving a request for a cloud service of the cloud services via a front-end graphical user interface;

receiving user input for provisioning a virtual desktop for the requested cloud service;

creating and displaying the virtual desktop, wherein displaying the virtual desktop includes displaying resources for designing the cloud service, the resources including servers, and virtual servers; and facilitate assessing technical feasibility of the cloud services system to provide cloud services, design of the cloud services, and ticket management.

\* \* \* \* \*

UNITED STATES PATENT AND TRADEMARK OFFICE
CERTIFICATE OF CORRECTION

PATENT NO. : 9,503,345 B2  
APPLICATION NO. : 13/776055  
DATED : November 22, 2016  
INVENTOR(S) : Pietro Caminiti et al.

Page 1 of 1

It is certified that error appears in the above-identified patent and that said Letters Patent is hereby corrected as shown below:

On the Title Page

Item (30) foreign application priority number should read "12425037.4".

Signed and Sealed this  
Third Day of January, 2017

Michelle K. Lee  
*Director of the United States Patent and Trademark Office*